Jan. 21, 1958 R. J. KLEINSTIVER 2,820,289
COMBINATION CAN OPENER AND DRINKING SPOUT
Filed July 6, 1956
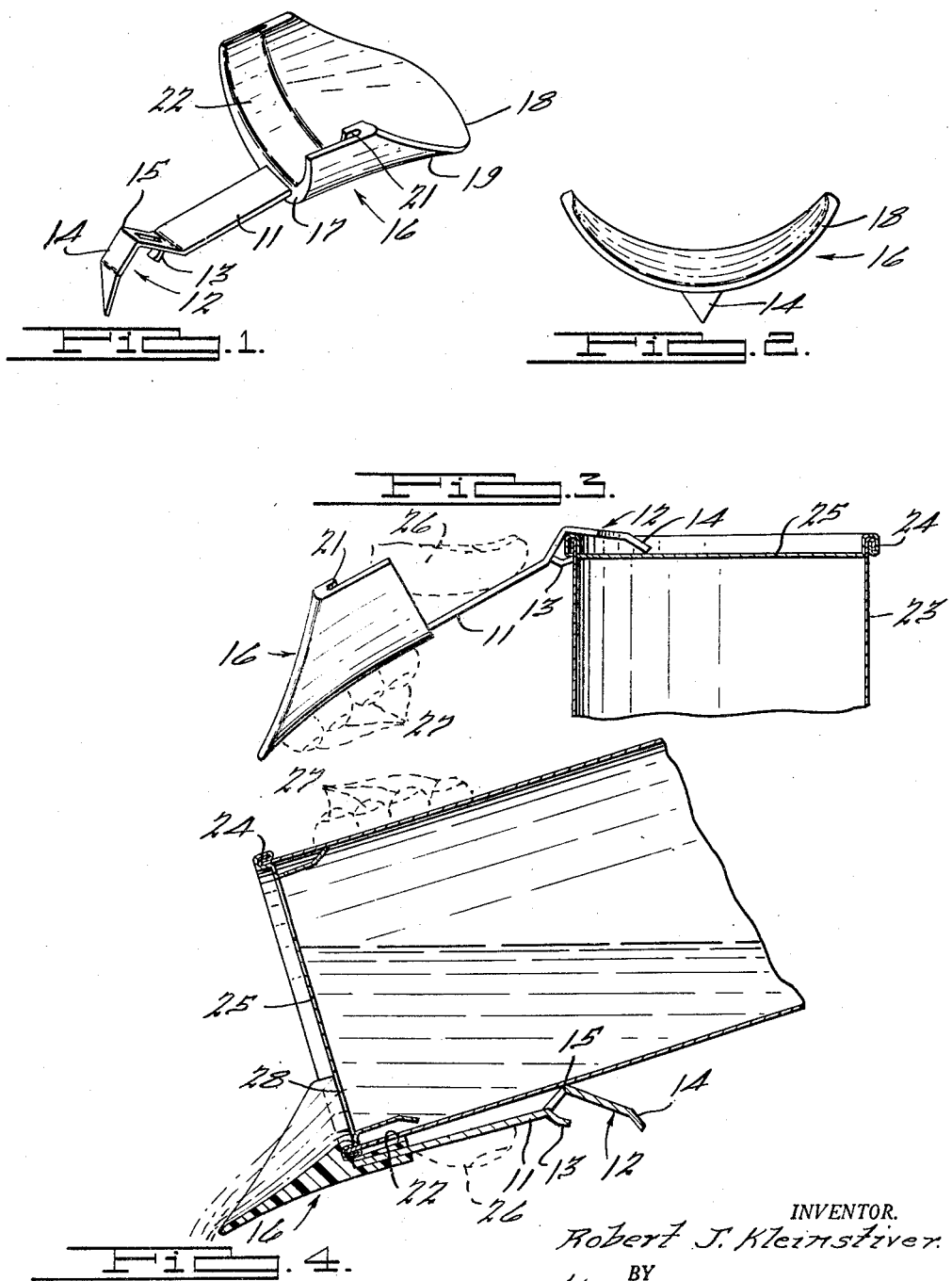
INVENTOR.
Robert J. Kleinstiver.
BY
Harness, Dickey & Pierce.
ATTORNEYS.

2,820,289
COMBINATION CAN OPENER AND DRINKING SPOUT

Robert J. Kleinstiver, Port Huron, Mich.

Application July 6, 1956, Serial No. 596,194

7 Claims. (Cl. 30—123)

This invention relates to openers for containers, and more particularly ot a combined can opener and drinking spout for use with standard diameter cans containing beer or other beverages.

It is an object of the invention to provide a novel utensil which may be utilized to open standard size cans of the type containing beer, soft drinks or the like, and which enables the contents of the opened cans to be drunk directly therefrom without the mouth of the drinker contacting the metal of the can.

It is a further object to provide an improved utensil of this character, which may be easily carried, is sturdy in use and is easily maintained in drinking position whether the can is being held by the user or is resting on a table.

It is another object to provide an improved device of the above nature which is of simple and economical construction, and may be made in a variety of attractive shapes and colors.

Other objects, features and advantages of the present invention will become apparent from the subsequent description, taken in conjunction with the accompanying drawings.

In the drawings:

Figure 1 is a perspective view of the novel utensil of the invention showing the relative proportions of the parts;

Figure 2 is an end view of the device showing the lateral configuration of the drinking spout;

Figure 3 is an elevational view of a beverage container showing the device applied thereto in position to open the container; and Figure 4 is an elevational view showing the novel utensil in drinking position on the container.

The device comprises a flat metallic shank 11 which has formed integrally therewith at one end an opener of a standard type, generally indicated at 12, adapted to cut triangular openings in the tops of beverage containers such as beer cans. This conventional type of opener has a finger 13 extending outwardly and to one side of shank 11 for engaging the underside of one of the end rims of the can, and a claw 14 extending beyond finger 13 for cutting a triangular opening in the can top. A ridge 15 is formed in opener 12 at the base of claw 14 to provide clearance for the opener elements during operation. Ridge 15 is on the side of shank 11 opposite finger 13, and claw 14 extends toward the same side of the shank as the finger.

The opposite end of shank 11 carries a drinking spout generally indicated at 16. The spout is formed of an appropriate material such as a molded plastic substance, and shank 11 is embedded in and secured to spout 16 in such a manner that the shank, opener and spout together form an integral unit.

Spout 16 is so formed as to be capable of performing the combined functions of a handle for opener 12 and a spout which may be fitted to the can rim and held to the mouth of the drinker. For this purpose, spout 16 is arcuately shaped in a lateral direction, the concave side of the spout facing in the same direction as ridge 15. The spout has a flat relatively wide inner end surface 17 penetrated by shank 11 and a tapered and rounded lip edge 18 at the outer end so shaped as to be received easily in the mouth. If desired, spout 16 may be provided with a slight concave curvature 19 in a longitudinal direction to accommodate the drinker's lower lip and aid in conduction of the liquid. The thickness of spout 16 preferably decreases in a tapered manner toward the opposite lateral sides, as indicated in Figure 2.

The means on spout 16 for engaging the can rim comprises an arcuate groove 21 provided on the concave side of the spout and facing toward the end of shank 11 which carries opener 12. This groove is formed by providing the spout with a relatively thick section at an intermediate portion thereof, a concave surface 22 extending from end surface 17 to groove 21 which is located at this intermediate section. The depth and curvature of groove 21 are such that when it is applied to the rim of a standard size beverage can, spout 16 will be firmly held thereon. Surface 22 is so shaped as to permit groove 21 to be easily applied to the can rim, and this surface is so disposed relative to ridge 15 that both portions of the device may simultaneously engage the side of the can, for purposes which will hereinafter appear.

The use of the utensil as both a can opener and a drinking spout is illustrated in Figures 3 and 4. Figure 3 shows the utensil in position to open a beverage can 23, with finger 13 engaging the underside of rim 24 and claw 14 about to penetrate the top 25 of the can. It will be noted that when used in this manner, spout 16 provides a convenient gripping handle whereby the cutting action of opener 12 may be carried out with sufficient leverage, the thumb 26 of the user engaging shank 11 while his fingers 27 are pressed against the convex surface of spout 16.

After the proper number of openings have been made in the can top, groove 21 is fitted on rim 24 adjacent the opening 28 from which the beverage is to be poured, as shown in Figure 4. It will be noted that when in this position shank 11 and opener 12 are disposed alongside the can, with claw 14 facing away from the can. The user may grasp the can and spout conveniently by placing his thumb on shank 11 and his fingers around the opposite side of the can, and may tilt the can into drinking position. The beverage will pour from opening 28 in the can top and be guided by spout 16 into the mouth. It should be observed that when the can and utensil are grasped, ridge 15 will be pressed against the side of the can and surface 22 of the spout held against rim 24. As indicated previously, the relative disposition of these two portions of the device are such that the spout will be held firmly in place. Opener 12 will be remote from opening 28 and will not interfere with the free flow of liquid to the spout.

While drinking, no portion of the user's mouth will come in contact with the metallic surface of the can, thus avoiding the sometimes distasteful feeling which accompanies such contact. For this purpose, the width of spout surface 22 in a longitudinal direction is such that the spout extends a substantial distance along the side of the can to prevent can contact by the lower as well as the upper lip of the user. The utensil will stay in position when the partially used can is resting on a table and may be easily regrasped. When the can has been emptied, the device is easily removed therefrom for washing and reuse.

It will be appreciated that the novel utensil, and particularly spout 16 thereof, is capable of being manufactured in a variety of colors and shapes, so that individualized styles may be produced and the cans of persons at a picnic or other gathering easily identified. The particular curvature with which the spout is manufactured could also be varied to fit cans other than the standard diameter containers mentioned above.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a combination can opener and drinking spout, a shank, an opener carried by one end of said shank, said opener having a finger adapted to engage the underside of a can rim and a claw for cutting an opening in the can top, said opener having a ridge formed adjacent said finger, a drinking spout carried by the other end of said shank, and means adjacent said spout co-operable with said ridge for mounting the combined spout and opener adjacent an opening in the can top with said opener remote from said opening and said ridge engaging the side of said can to properly position said combination can opener and drinking spout on said can, whereby liquid poured from said opening will be guided by said spout.

2. In a combined opener and drinking spout for beverage cans having a predetermined diameter, a flat shank, an opener formed at one end of said shank, said opener being of the type adapted to cut a triangular opening in the can top, a drinking spout carried by the opposite end of said shank, said opener having a ridge formed adjacent said finger, and an arcuate groove formed adjacent said spout, the radius of said arc being such that said groove will fit over the rim of a can adjacent an opening cut by said opener, whereby liquid poured from said opening will be guided by said spout, said arcuate groove being so disposed relative to said ridge that when said groove is fitted over the rim of a can and the spout in proper position, said ridge engages the side of the can.

3. In a combined opener and drinking spout for beverage cans having a predetermined diameter, a flat metallic shank, an opener formed at one end of said shank and integral therewith and having a ridge at one side thereof, and a non-metallic member carried by the opposite end of said shank, said member having its outer portion formed as a drinking spout and an intermediate portion formed with a groove adapted to engage the can rim adjacent an opening cut by said opener, the concave side of said drinking spout of said non-metallic member being at said one side of said shank and said ridge engaging the side of the can to position said drinking spout when said groove engages the can rim.

4. In a combined opener and drinking spout for beverage cams, a flat metallic shank, an opener formed at one end of said shank and integral therewith, said opener having a finger engageable with the underside of the can rim and a claw extending beyond said finger and pointing to one side of said shank for cutting an opening in the can top, said opener having a ridge at the base of said claw and at the opposite side of said shank, a non-metallic drinking spout of arcuate shape, one end of said shank being embedded in the inner end of said spout, the outer end of said spout being shaped to fit the mouth of a user, the concave side of said spout facing in a direction opposite to said claw, and a groove formed in an intermediate portion of said spout and facing the inner end, said groove being adapted for engagement with the rim of said can adjacent an opening cut by said opener, whereby liquid poured from said opening will be guided by said spout, said ridge being so disposed relative to said groove that said ridge engages the side of said can when said groove engages the rim of said can.

5. In a combined can opener and drinking spout, a metallic shank carrying an opener at one end and a non-metallic drinking spout at the opposite end thereof, said opener having a finger for engagement with a rim of said can, a ridge formed adjacent said finger, and a claw extending from said ridge for cutting an opening in the can top, said drinking spout having an arcuate shape with the concave side thereof facing away from the direction of said claw, a groove formed in an intermediate portion of said spout and adapted to engage the rim of a can adjacent an opening cut by said opener, and a concave arcuate surface on said spout between said groove and the inner end of the spout, the ridge of said opener being approximately aligned with said arcuate surface, whereby the device may be held firmly against the side of a can when in drinking position by engagement of the user's thumb with said shank, said ridge and arcuate surface simultaneously engaging the can.

6. The combination according to claim 5, the inner end of said drinking spout having a surface transverse to said shank, said surface being relatively wide at its midportion and tapering to a relatively narrow width at its outer lateral portions, said shank penetrating the midportion of said end surface and being embedded in said drinking spout.

7. The combination according to claim 5, the outer end of said drinking spout having a tapered and rounded edge, the convex surface of said spout having a slight concave curvature in a longitudinal direction to accommodate the lower lip of the user.

References Cited in the file of this patent

UNITED STATES PATENTS

| 1,245,333 | Goldberg | Nov. 6, 1917 |
| 1,964,644 | Nall | June 26, 1934 |

FOREIGN PATENTS

| 70,730 | Denmark | Mar. 13, 1950 |